(12) United States Patent
Fuerstner (10) Patent No.: US 11,646,889 B2
(45) Date of Patent: May 9, 2023

(54) DONGLES AND METHOD FOR PROVIDING A DIGITAL SIGNATURE

(71) Applicant: RIDDLE & CODE GMBH, Vienna (AT)

(72) Inventor: Thomas Fuerstner, Madliena (MT)

(73) Assignee: RIDDLE & CODE GMBH, Vienna (AT)

( * ) Notice: Subject to any disclaimer, the term of this patent is extended or adjusted under 35 U.S.C. 154(b) by 0 days.

(21) Appl. No.: 16/954,499

(22) PCT Filed: Dec. 18, 2018

(86) PCT No.: PCT/EP2018/085602
§ 371 (c)(1),
(2) Date: Jun. 16, 2020

(87) PCT Pub. No.: WO2019/121751
PCT Pub. Date: Jun. 27, 2019

(65) Prior Publication Data
US 2021/0167964 A1    Jun. 3, 2021

(30) Foreign Application Priority Data

Dec. 19, 2017 (EP) .................................... 17208564

(51) Int. Cl.
*H04L 9/08* (2006.01)
*H04L 9/32* (2006.01)
*H04B 17/318* (2015.01)

(52) U.S. Cl.
CPC ......... *H04L 9/3234* (2013.01); *H04B 17/318* (2015.01); *H04L 9/088* (2013.01);
(Continued)

(58) Field of Classification Search
CPC ..... H04L 9/3234; H04L 9/088; H04L 9/3221; H04L 9/3247; H04B 17/318
See application file for complete search history.

(56) References Cited

U.S. PATENT DOCUMENTS

| 5,910,989 A | 6/1999 | Naccache |
| 7,552,333 B2 * | 6/2009 | Wheeler ............ G06Q 20/3829 380/282 |

(Continued)

FOREIGN PATENT DOCUMENTS

| CA | 2889006 A1 * | 7/2014 | ............ G06Q 20/20 |
| JP | H10506727 A | 6/1998 | |

(Continued)

OTHER PUBLICATIONS

Japan Patent Office, Office Action Issued in Application No. 2020-533232, dated Aug. 4, 2021, 4 pages.
(Continued)

*Primary Examiner* — Darshan I Dhruv
(74) *Attorney, Agent, or Firm* — McCoy Russell LLP (57) ABSTRACT

Set of two or more dongles for providing a digital signature, wherein each dongle holds a secret key, wherein each dongle is configured to receive a message, to compute a digital signature of the received message using the secret key, and to transmit the computed digital signature, wherein at least one of the dongles is configured to, before computing the digital signature, verify the presence of at least one other dongle belonging to the set, and to compute the digital signature only upon successful verification of the presence of one or more other dongles.

19 Claims, 3 Drawing Sheets

(52) U.S. Cl.
CPC .......... *H04L 9/3221* (2013.01); *H04L 9/3231* (2013.01); *H04L 9/3247* (2013.01)

(56) References Cited

U.S. PATENT DOCUMENTS

| | | | | |
|---|---|---|---|---|
| 8,700,899 B1* | 4/2014 | Juels | ................... | H04W 12/043 |
| | | | | 380/47 |
| 9,794,753 B1* | 10/2017 | Stitt | .................... | H04W 12/069 |
| 2002/0016913 A1 | 2/2002 | Wheeler et al. | | |
| 2005/0050352 A1* | 3/2005 | Narayanaswami | ..... | H04W 8/16 |
| | | | | 713/160 |
| 2008/0301466 A1* | 12/2008 | Hsu | .......................... | G06F 8/65 |
| | | | | 713/189 |
| 2011/0060903 A1* | 3/2011 | Yoshida | ................ | H04L 9/3218 |
| | | | | 713/155 |
| 2014/0059353 A1* | 2/2014 | Picazo | ................. | H04W 4/023 |
| | | | | 713/176 |
| 2016/0275461 A1* | 9/2016 | Sprague | ................ | H04W 12/06 |
| 2016/0350728 A1 | 12/2016 | Melika et al. | | |
| 2018/0254898 A1* | 9/2018 | Sprague | ................. | H04L 9/006 |

FOREIGN PATENT DOCUMENTS

| | | | |
|---|---|---|---|
| JP | H10293804 A | | 11/1998 |
| JP | 2004362552 A | | 12/2004 |
| JP | 2006268577 A | | 10/2006 |
| JP | 2016206982 A | | 12/2016 |
| KR | 100966412 B | | 6/2010 |
| KR | 101156813 B | | 6/2012 |
| KR | 20170058258 A | * | 8/2016 ......... G06Q 20/3226 |
| KR | 20170058258 A | | 5/2017 |
| WO | WO-9633567 A1 | * | 10/1996 ........... G06Q 20/341 |
| WO | 2005117336 A1 | | 12/2005 |
| WO | WO-2006105498 A2 | * | 10/2006 ......... H04L 63/0478 |
| WO | WO-2006111979 A2 | * | 10/2006 ............. G06F 21/64 |
| WO | WO-2013051032 A1 | * | 4/2013 ........... G06K 7/0004 |
| WO | WO-2019081667 A1 | * | 5/2019 ........... G06Q 20/065 |

OTHER PUBLICATIONS

Korean Intellectual Property Office, Office Action Issued in Application No. 10-2020-7017303, dated Aug. 20, 2021, 14 pages.

Wang, Y. et al., "Practical (fully) distributed signatures provably secure in the standard model," Theoretical Computer Science, vol. 595, No. C, Aug. 30, 2015, Available Online Jun. 13, 2015, 16 pages.

Canadian Intellectual Property Office, Examination Report Issued in Application No. 3,083,382, dated Jul. 30, 2021, 4 pages.

Stinson, D. et al., "Provably Secure Distributed Schnorr Signatures and a (T,N) Threshold Scheme for Implicit Certificates," Proceedings of the Australasian Conference on Information Security and Privacy, Jul. 4, 2001, Christchurch, New Zealand, 18 pages.

European Patent Office, Extended European Search Report Issued in Application No. 17208564.9, dated Jun. 11, 2018, Germany, 6 pages.

ISA European Patent Office, International Search Report Issued in Application No. PCT/EP2018/085602, dated Mar. 20, 2019, WIPO, 4 pages.

* cited by examiner

DONGLES AND METHOD FOR PROVIDING A DIGITAL SIGNATURE

CROSS-REFERENCE TO RELATED APPLICATIONS

The present application is a U.S. National Phase of International Patent Application Serial No. PCT/EP2018/085602 entitled "DONGLES AND METHOD FOR PROVIDING A DIGITAL SIGNATURE," filed on Dec. 18, 2018. International Patent Application Serial No. PCT/EP2018/085602 claims priority to European Patent Application No. 17208564.9 filed on Dec. 19, 2017. The entire contents of each of the above-referenced applications are hereby incorporated by reference for all purposes.

TECHNICAL FIELD

The invention concerns a set of two or more dongles and a method for providing a digital signature with a dongle belonging to such a set, wherein each dongle holds a secret key, wherein each dongle is configured to receive a message, to compute a digital signature of the received message using the secret key, and to transmit the computed digital signature, wherein the method comprises: receiving a message to be signed, computing a digital signature of the message using the secret key, and transmitting the computed digital signature.

BACKGROUND AND SUMMARY

Here the term "secret key" refers to any secret information held by or stored on the respective dongle that can be used for signing a message. The secret key is generally different for each dongle, i.e. there are no two dongles sharing the same secret key. Specifically, the secret key may be a private signing key; it is preferably stored in a secure element or tamperproof memory inside the respective dongle holding it. The secure element is preferably a secure cryptoprocessor (e.g. of the type used in smartcards), i.e. a dedicated computer on a chip or microprocessor for carrying out cryptographic operations, embedded in a packaging with multiple physical security measures, which give it a degree of tamper resistance. Generally, the set may also comprise dongles that do not hold a secret key and are not configured for signing a message themselves, but serve only as witnesses, whose presence needs to be verified by the at least two dongles doing the actual signing. The message to be signed, or generally "message", can be any signal or data structure can be received and signed by a dongle. The invention specifically concerns the preparation and provision of multi-signature transactions of digital currencies (also "cryptocurrencies") or generally blockchain applications; in this application the message may be a transaction (a data structure holding transaction details) including a so-called "redeem script". The multi-signature preferably comprises signatures from at least two dongles of the set. The message may be received from a host connected to the dongle via a data connection (USB, Bluetooth, etc.) and the computed digital signature may be transmitted back to the host using the same data connection or a different data connection or to a different host altogether. Computation of a digital signature of the received message using the secret key is equivalent to signing the message with the secret key. Depending on the cryptographic implementation of the digital signature, that digital signature may for instance be verified with a public key derived from the secret key.

Digital currencies (e.g. bitcoin) allow for the generation of addresses, of which any outgoing transaction requires a multi-signature. Multiple secret keys (or private keys) are needed for producing a valid outgoing transaction from such a multi-signature address. The number M of required secret keys is generally lower than or equal to the number N of authorised private keys. Therefore, valid outgoing transactions are also referred to as M-of-N multi-signature transactions. For generating such a multi-signature address, one needs to provide the public keys of all N authorised private keys as well as the number M of required signatures for a valid outgoing transaction.

Multi-signature addresses are used when a transaction should require the consent of multiple persons, wherein each person controls one authorised private key, and/or when multiple factors should be required for a valid transaction, wherein each authorised private key is protected differently (e.g. stored on different storage means and kept at different locations). While conventional digital signatures or "single-signatures" must compromise security for reliability (e.g. a key loss can be avoided by backups, which on the other hand introduce new attack vectors), digital multi-signatures allow to achieve any desired level and balance of security and reliability. Consequently, they are particularly suited for protecting safety critical transactions.

One flaw of the present methods for providing digital multi-signatures is that the individual signatures can be produced at arbitrary different points in time and compiled to a valid multi-signature later.

It is an object of the present invention to overcome this flaw and to improve security of the generation process for providing digital signatures.

The invention solves this object with a set of dongles of the kind stated in the outset, wherein at least one of the dongles is configured to, before computing the digital signature, verify the presence of at least one other dongle belonging to the set, and to compute the digital signature only upon successful verification of the presence of one or more other dongles. If and only if the presence of one or more other dongles has been verified (i.e. successfully), the dongle proceeds to compute the digital signature of the received message.

Correspondingly, the invention solves the above object with a method of the kind stated in the outset, comprising: before computing the digital signature, verifying the presence of at least one other dongle belonging to the set; and computing the digital signature only if the verification is successful.

By verifying the presence of at least one other dongle, the first dongle ensures, that at least two secret keys (one held by each dongle) must be present and available for signing simultaneously. The signing procedure of at least two dongles must be concerted. An adversary trying to produce a valid multi-signature would need to control at least two dongles at the same time, which is generally more difficult to achieve (especially undetected) than control of each individual dongle in turn.

Preferably, the at least one of the dongles verifies the presence of at least one other dongle belonging to the set by requiring a zero-knowledge proof. Correspondingly, the step of verifying the presence of at least one other dongle belonging to the set within the present method may require a zero-knowledge proof, including: sending a request for providing the zero-knowledge proof to the at least one other dongle, receiving a zero-knowledge proof from the at least one other dongle, and verifying the received zero-knowledge proof, wherein the presence of the at least one other dongle is verified if the verification of the received zero-knowledge proof is successful. In principle, the zero-knowledge proof serves as a proof of presence, because only the at least one other dongle can provide the proof and only if it is present (i.e. reachable from the at least one dongle requesting the proof for verifying presence). The zero-knowledge proof may be implemented by a challenge-response protocol, wherein the at least one other dongle (the prover) and the at least one of the dongles (the verifier or the verifiers) are connected. The challenge can be a temporary (preferably one-time) token with a time-limited validity. The connection between two dongles may be a direct connection, for instance a Bluetooth, ZigBee or Wi-Fi (WPAN) connection, or routed via one or more hosts coordinating the concerted signing procedure.

In a preferred embodiment of the present method, verifying the received zero-knowledge proof comprises validating the received proof with a collection of stored identities of all other dongles belonging to the same set.

Advantageously, the at least one other dongle (the prover) is configured to receive a signing trigger and to provide the required zero-knowledge proof only within a limited timeframe following reception of the signing trigger. Correspondingly, the present method may comprise: before receiving a message to be signed, the dongle (the prover) first receives a signing trigger, wherein said signing trigger switches the dongle into a signing mode for a limited timeframe following reception of the signing trigger, wherein after lapse of said timeframe the dongle switches into a standby mode, wherein the dongle sends zero-knowledge proof of its presence to other dongles and computes digital signatures using the secret key only when in signing mode. The signing trigger is preferably a physical trigger on the respective dongle, e.g. a physical button that is pressed by a user controlling said dongle for signalling approval of a concerted signing procedure. After the timeframe (e.g. five minutes) following the signing trigger has lapsed, the at least one other dongle will enter standby mode and not provide any requested zero-knowledge proof until another signing trigger happens and the dongle enters signing mode again. A request for a zero-knowledge proof received outside of the timeframe (i.e. in standby mode) may be stored as a pending request and notified to a user of the respective dongle. This notification can serve two purposes: it signals to the user the signing attempt and reminds them to operate the signing trigger in case of approval of a concerted signing procedure.

The zero-knowledge proof mentioned above may be a zero-knowledge proof of knowledge of a secret key, which may be the secret key used for signing (the secret signing key) or another secret key (a secret presence key). Preferably, each dongle holds a further secret key (a secret presence key) and the zero-knowledge proof concerns possession of the further secret key. Each dongle has a different further secret key or secret presence key. The further secret key represents a private identity of the dongle holding it. Thereby, the further secret keys may be locked inside each dongle during provisioning by the manufacturer of the set of dongles. The secret signing keys can then be generated outside the control of the manufacturer by each of the dongle owners independently without compromising the cryptographic link between the dongles established by the further secret keys. The dongle owners then provide only a public signing key for later verification of their signature and e.g. for constructing multi-signature addresses.

Preferably, the at least one of the dongles stores the identities of all other dongles belonging to the same set. Said identities may be stored as secret-derived information, such as a public key corresponding to a secret presence key or a private identity. The identities may preferably be stored in the secure element or tamperproof memory inside the dongle, together with the secret key (the secret signing key). Correspondingly, verifying the presence of at least one other dongle preferably includes verifying the identity of present other dongles by comparing with the stored identities. The stored identities may be used to verify a proof of presence provided by at least one of the other dongles, for example by verifying that a challenge was signed with a secret presence key of which a corresponding public presence key is (or is included in) one of the identities stored by the verifying dongle.

In a preferred embodiment of the present set, the at least one of the dongles stores a lower limit of the number of other dongles, the presence of which must be proven, before computing the digital signature. Correspondingly, the present method may comprise: before computing a signature of the received message, requiring that a total number of dongles, of which the presence has been verified (after reception of the message), is greater or equal to a predefined lower limit. Hence, in this case the dongle computes a signature of the received message with its own secret key only if it has successfully verified the presence (optionally including that those dongles are in signing mode) of at least as many dongles as defined by the lower limit. The other dongles must belong to the same set in order for the presence to count for this requirement, i.e. they must be "signatory dongles" participating in the same multi-signature as the present verifying dongle. Also, the presence of the other dongles is verified during the same session, during which the received message shall be signed. The lower limit can be between one and the total number of dongles belonging to the same set minus one (for the verifying dongle itself). By enforcing the presence of a sufficient number of signatory dongles, the feasibility of a valid M-of-N multi-signature can be tested before actually computing any signatures. Where N is the total number of dongles belonging to the same set (the total number of signatory dongles) and M is the number of required signatures of a valid multi-signature. If M is smaller than N, the lower limit will be between one and M minus one.

Moreover, it has turned out advantageous, that the at least one dongle is configured to measure the time required for verifying the presence of the at least one other dongle belonging to the set and to compute the digital signature only upon successful verification of the presence of one or more other dongles within a predefined timeframe for each of the one or more other dongles. Correspondingly, the present method advantageously comprises: during verifying the presence of at least one other dongle belonging to the set, measuring the time required for verifying the presence, and, before computing a signature of the received message, requiring that the time required is within a predefined timeframe for each of the one or more other dongles. In particular, the verifying dongle may be configured to measure the round-trip delay time between requesting and receiving a proof of presence (e.g. a zero-knowledge proof). By enforcing an upper limit on the round-trip delay time, a direct (unmediated) connection and a maximum physical distance of the dongles can be tested. The acceptable predefined timeframe can be chosen according to measurements of the round-trip delay time of the actual dongles during an initialisation procedure. An adversary trying to spoof the presence of a dongle would need to ensure that the round-trip delay time does not exceed the predefined timeframe. For distant dongles and/or connections that are routed across a network, this may turn out physically impossible, effectively ruling out this attack vector.

Preferably, the dongles are configured to establish direct wireless connections between each other for verification of presence, wherein the at least one dongle is configured to measure the signal strength of the wireless connection to the at least one other dongle belonging to the set and to compute the digital signature only if the signal strength exceeds a predefined minimum signal strength or a distance measure derived from the signal strength is below a maximum distance for each of the one or more other dongles. Correspondingly the present method preferably comprises: measuring the signal strength of a wireless connection to the at least one other dongle belonging to the set, and, before computing a signature of the received message, requiring that the measured signal strength exceeds a predefined minimum signal strength and/or a distance measure derived from the measured signal strength is below a predefined maximum distance for each of the one or more other dongles. Hence, the verifying dongle will compute a signature of the received message using its own secret key only if the signal strength of one or more of the other dongles from the set is above the threshold minimum signal strength or if the distance measure derived from the signal strength is below the threshold maximum distance. The wireless connections may be for example Bluetooth, NFC, RFID, Google Thread, ZigBee or WPAN connections or generally any connections from the 802.15.4 suite of protocols (mesh network connections). The physical signal strength (RX value) measured in milliwatts or dB-milliwatts (dBm) or the received signal strength indication (RSSI) measured in a percentage can be used as a measure of the signal strength. By enforcing a lower limit on the signal strength or distance, a maximum physical distance of the dongles can be ensured, wherein the maximum physical distance can be defined more accurately than by an upper limit on the round-trip delay time. Preferably, the two measures are combined to achieve security and accuracy at the same time.

According to a preferred embodiment of the present invention, at least one of the dongles can be configured to verify the presence of a mobile terminal before confirming its own presence to any other dongle. Correspondingly, the present method may comprise: before computing a signature of the received message or providing a zero-knowledge proof, verifying the presence of a mobile terminal connected to the dongle. The mobile terminal may be any mobile computer terminal, for example a smartphone, smartwatch or tablet computer. The verification of presence of a mobile terminal can be similar to the verification of presence of one or more other dongles belonging to the set. In one instance the presence of the mobile terminal (or—more specifically—a proof thereof) may be required before computing the signature of the received message; in a second instance and independently thereof, the presence of the mobile terminal may be required for the presence of the dongle itself, i.e. it may be required before the dongle enters signing mode. In these embodiments, the mobile terminal serves as a second factor for using the dongle in the concerted signing procedure. This is based on the recognition that absence of a mobile terminal that is typically used frequently by its user will be noticed more likely than the absence of a dongle that might be used less frequently. An adversary would need to seize control of the dongle as well as the mobile terminal, which is very likely to get noticed by the respective owner and therefore increases the security of the entire setup.

In this context it has turned out advantageous that the mobile terminal is configured to confirm its presence only within a limited timeframe after authentication of a user of the mobile terminal, preferably a biometric authentication. Correspondingly, verifying the presence of mobile terminal during the present method may comprise authenticating a user of the mobile terminal, preferably using at least partially biometric credentials. In the above, the term "presence" is frequently used to mean "availability for signing" (for example being in "signing mode"). Consequently, the signing procedure requires that the users of any participating mobile terminals have expressed their consent with the signing by providing (optionally biometric) authentication credentials. The use of biometric authentication credentials has the advantage that it facilitates auditing the concerted signing procedure with respect to the participating individuals.

Preferably, at least one of the dongles stores a white list for identifying acceptable messages and is configured to verify that the received message is an acceptable message according to said white list and to compute the digital signature only upon successful verification of the received message. Correspondingly, the present method may comprise: before computing a signature of the received message, requiring that the received message is an acceptable message according to a white list stored on the dongle. The white list may be a collection of properties of acceptable messages. For example, when the present invention is applied to signing transactions, the white list may contain receiving addresses and only transactions to one of those receiving addresses on the white list are considered acceptable. Only after a message or transaction has been tested and found to be acceptable, then a digital signature of this message or transaction is computed using the secret key. Hence, an adversary must either be able to compromise the white list (which is preferably stored in a secure element or tamper-proof memory inside the dongle using it) or control one of the receiving addresses on the white list.

In the following, preferred embodiments of the set and the method according to the invention will be defined, as well as preferred combinations thereof:

1. Set of two or more dongles for providing digital signatures,
    wherein each dongle holds a secret key,
    wherein each dongle is configured to receive a message, to compute a digital signature of the received message using the secret key, and to transmit the computed digital signature,
    characterised in that at least one of the dongles is configured to, before computing the digital signature, verify the presence of at least one other dongle belonging to the set, and to compute the digital signature only upon successful verification of the presence of one or more other dongles.
2. Set according to embodiment 1, wherein the at least one of the dongles is configured to verify the presence of at least one other dongle belonging to the set by requiring a zero-knowledge proof.
3. Set according to embodiment 2, characterised in that the at least one other dongle is configured to receive a signing trigger and to provide the required zero-knowledge proof only within a limited timeframe following reception of the signing trigger.
4. Set according to embodiment 2 or 3, wherein each dongle holds a further secret key and the zero-knowledge proof concerns possession of the further secret key.

5. Set according to one of the preceding embodiments, characterised in that the at least one of the dongles stores the identities of all other dongles belonging to the same set.
6. Set according to one of the preceding embodiments, characterised in that the at least one of the dongles stores a lower limit of the number of other dongles, the presence of which must be proven before computing the digital signature.
7. Set according to one of the preceding embodiments, characterised in that the at least one dongle is configured to measure the time required for verifying the presence of the at least one other dongle belonging to the set and to compute the digital signature only upon successful verification of the presence of one or more other dongles within a predefined timeframe for each of the one or more other dongles.
8. Set according to one of the preceding embodiments, characterised in that the dongles are configured to establish direct wireless connections between each other for verification of presence, wherein the at least one dongle is configured to measure the signal strength of the wireless connection to the at least one other dongle belonging to the set and to compute the digital signature only if the signal strength exceeds a predefined minimum signal strength and/or a distance measure derived from the signal strength is below a predefined maximum distance for each of the one or more other dongles.
9. Set according to one of the preceding embodiments, characterised in that at least one of the dongles is configured to verify the presence of a mobile terminal before confirming its own presence to any other dongle.
10. Set according to embodiment 9, characterised in that the mobile terminal is configured to confirm its presence only within a limited timeframe after authentication of a user of the mobile terminal, preferably a biometric authentication.
11. Set according to one of the preceding embodiments, characterised in that at least one of the dongles stores a white list for identifying acceptable messages and is configured to verify that the received message is an acceptable message according to said white list and to compute that digital signature only upon successful verification of the received message.
12. Method for providing a digital signature with a dongle belonging to a set according to one of embodiments 1 to 11, wherein the dongle holds a secret key, the method comprising the following steps:
    receiving a message to be signed;
    verifying the presence of at least one other dongle belonging to the set;
    if the verification is successful, computing a digital signature of the message using the secret key; and
    transmitting the computed digital signature.
13. Method according to embodiment 12, wherein the step of verifying the presence of at least one other dongle belonging to the set is characterised by requiring a zero-knowledge proof, including:
    sending a request for providing the zero-knowledge proof to the at least one other dongle,
    receiving a zero-knowledge proof from the at least one other dongle, and
    verifying the received zero-knowledge proof,
    wherein the presence of the at least one other dongle is verified if the verification of the received zero-knowledge proof is successful.
14. Method according to embodiment 13, characterised in that verifying the received zero-knowledge proof comprises validating the received proof with a collection of stored identities of all other dongles belonging to the same set.
15. Method according to one of embodiments 12 to 14, characterised in that before receiving a message to be signed, the dongle first receives a signing trigger, wherein said signing trigger switches the dongle into a signing mode for a limited timeframe following reception of the signing trigger, wherein after lapse of said timeframe the dongle switches into a standby mode, wherein the dongle sends zero-knowledge proof of its presence to other dongles and computes digital signatures using the secret key only when in signing mode.
16. Method according to one of embodiments 12 to 15, characterised in that before computing a signature of the received message, requiring that a total number of dongles, of which the presence has been verified, is greater or equal to a predefined lower limit.
17. Method according to one of embodiments 12 to 16, characterised by: during verifying the presence of at least one other dongle belonging to the set, measuring the time required for verifying the presence, and, before computing a signature of the received message, requiring that the time required is within a predefined timeframe for each of the one or more other dongles.
18. Method according to one of embodiments 12 to 17, characterised by: measuring the signal strength of a wireless connection to the at least one other dongle belonging to the set, and, before computing a signature of the received message, requiring that the measured signal strength exceeds a predefined minimum signal strength and/or a distance measure derived from the measured signal strength is below a predefined maximum distance for each of the one or more other dongles.
19. Method according to one of embodiments 12 to 18, characterised by: before computing a signature of the received message or providing a zero-knowledge proof, verifying the presence of a mobile terminal connected to the dongle.
20. The method according to embodiment 19, characterised by: verifying the presence of the mobile terminal comprises authenticating a user of the mobile terminal, preferably using at least partially biometric credentials.
21. Method according to one of embodiments 12 to 20, characterised by: before computing a signature of the received message, requiring that the received message is an acceptable message according to a white list stored on the dongle.

BRIEF DESCRIPTION OF THE FIGURES

Referring now to the drawings, wherein the figures are for purposes of illustrating the present invention and not for purposes of limiting the same.

DETAILED DESCRIPTION

Figure 1:
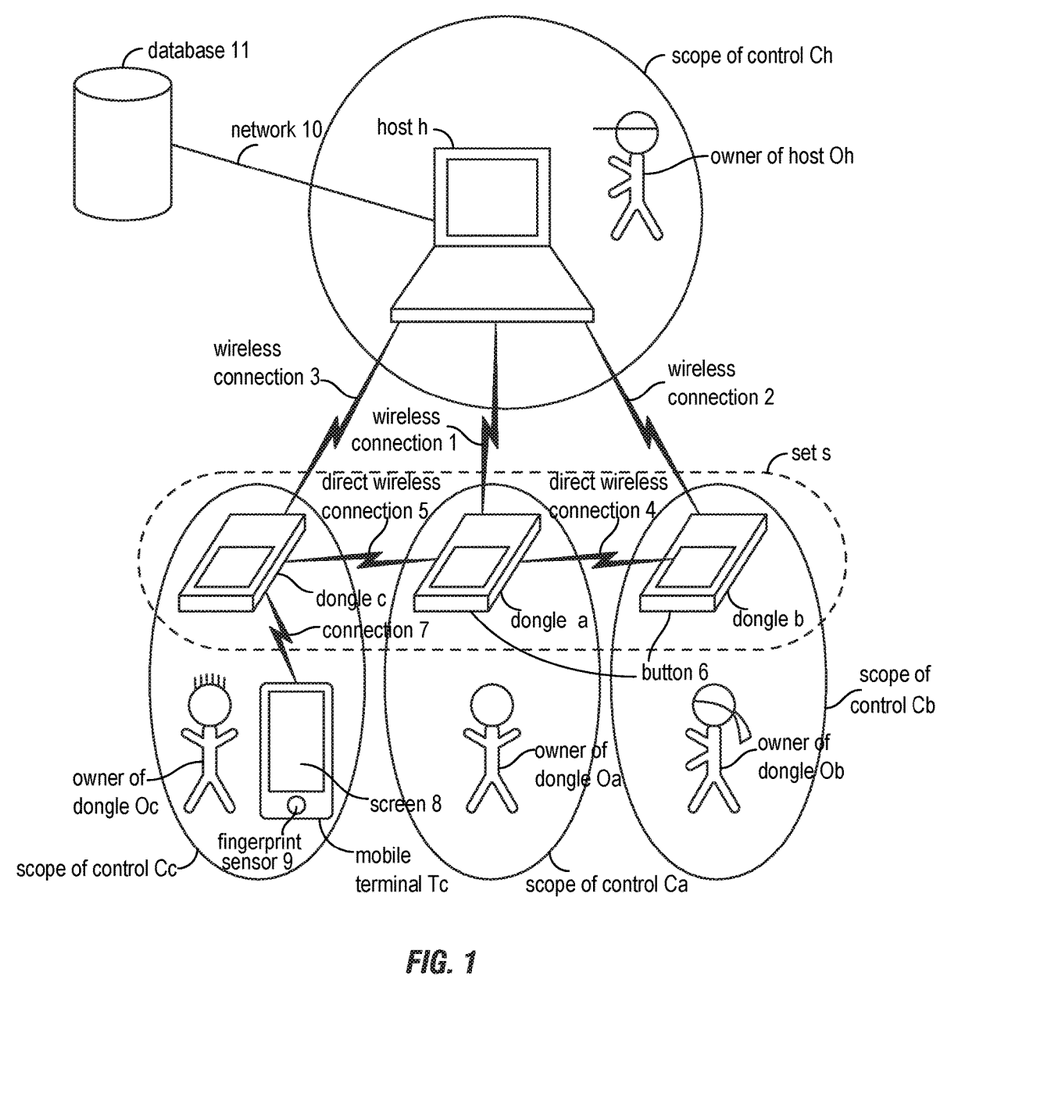
FIG. 1 schematically shows a use-case of a set of three dongles according to the present invention.

The use-case schematically illustrated by FIG. 1 involves a set s of three dongles a, b, c. Each of the dongles a, b, c is configured to provide a digital signature $S_i(M)$ of a message M (compare FIG. 2), wherein $S_i(M)=S(M,K_i)$ and $K_i$ is a secret key held by dongle i and wherein i is one of a, b or c. The secret key $K_i$ is a secret information that is securely stored on the respective dongle i. It can be generated at random locally on the dongle i during an initialisation procedure and preferably never leaves the dongle i. Therefore, each dongle i in general holds a different secret key $K_i$.

The dongles a, b, c are mobile (battery-powered), portable devices that fit into a pocket. Typically, owners $O_i$ (i.e. $O_a$, $O_b$, $O_c$) of dongles i used for high-security applications are required to carry their respective dongle i with them at all times. This is to ensure that each dongle i remains under the exclusive control of its respective owner $O_i$. This situation is indicated in FIG. 1 by circles limiting the scope of control $C_i$ of each dongle i. The same applies essentially to a host h, its owner $O_h$ and scope of control $C_h$.

As is shown in FIG. 1, each dongle i is connected to the host h, which is a separate computer, for example a workstation or laptop. The connections 1, 2, 3 are wireless connections, for example using Bluetooth technology. Alternatively, one or more of the dongles i may be connected to the host h using a wired connection, such as a USB connection. The dongles i are connected to each other by additional, direct wireless connections 4, 5, for example also using Bluetooth technology. Although only a direct connection 4 between dongle a and dongle b as well as a direct connection 5 between dongle a and dongle c are indicated in FIG. 1, there can be an additional direct connection between dongle b and dongle c. Each dongle i comprises a physical button 6 that can be pressed by its respective owner $O_i$. Dongle c has an additional (third) wireless connection 7 to a mobile terminal $T_c$ associated with this dongle c. The mobile terminal $T_c$ is a personal smartphone of the owner $O_c$ of dongle c. The mobile terminal $T_c$ comprises a screen 8 and a fingerprint sensor 9. Other biometric sensors might be included with the mobile terminal $T_c$, such as sensors for performing face recognition and/or voice recognition. In general, those biometric sensors are configured to authenticate the owner $O_c$ of the dongle c.

The host h is connected over a network 10 with a database 11. The database 11 represents a public transaction directory that is accessible online, i.e. via the Internet. The database 11 is preferably a distributed public transaction directory, preferably a distributed blockchain of the type used for securing transactions of digital currencies (e.g. Bitcoin or Ethereum).

Each dongle i is configured to receive a message M from the host h over a wireless connection 1, 2, 3 using suitable wireless transmission components (e.g. a Bluetooth transceiver) of a type widely available. Similarly, each dongle i is configured to transmit a computed digital signature $S_i(M)$ with or without a copy of the message M back to the host h over a wireless connection 1, 2, 3. Moreover, each dongle i is configured to compute a digital signature $S_i(M)$ of the received message M using the secret key $K_i$. Typically, the secret key $K_i$ is stored in a secure element that is configured to accept messages M and return corresponding signatures $S_i(M)$, which are cryptographically derived from the accepted message M and the secret key $K_i$. The secret key $K_i$ itself therefore never has to leave the secure element or become known outside the secure element. The secure element is preferably a secure cryptoprocessor.

Each dongle i is further configured to verify the presence of one or both of the two other dongles i as will be explained in more detail in connection with FIG. 2. Only if this procedure of verification of presence is successful, because all required conditions have been tested and are found to be met, the dongle i will proceed to compute the digital signature $S_i(M)$. Preferably, some or all of those conditions are tested within the secure element of the respective dongle i. In the present example, dongle a is configured to verify the presence of dongle b belonging to the same set s by requiring a zero-knowledge proof. The required zero-knowledge proof is a digital signature $S(R_a,I_b)$ of a random challenge $R_a$ generated by dongle a and transmitted to dongle b over connection 4, and using the private identity $I_b$ of dongle b. Dongle b is configured to provide the required zero-knowledge proof and compute the digital signature $S(R_a,I_b)$ only within a limited timeframe 12 following reception of a signing trigger 13. The private identity $I_b$ is a further secret key that is preferably stored within the same secure element of the dongle b as the secret key $K_b$. The signing trigger 13 can be activated by the owner $O_b$ of dongle b by pressing button 6 of the dongle b. The dongle a requiring the zero-knowledge proof stores the identities $P(I_i)$ of the other two dongles b and c belonging to the same set, i.e. $P(I_b)$ and $P(I_c)$. Here the identities $P(I_i)$ are public keys corresponding to the respective private identity $I_i$ and cryptographically derived therefrom. Since the presence is a condition for computing the digital signature $S_a(M)$, the zero-knowledge proof in the form of the digital signature $S(R_a,I_b)$ is preferably verified by the secure element. Hence, the identities $P(I_i)$ including the identity $P(I_b)$ required for verifying the signature $S(R_a,I_b)$ is preferably stored inside the same secure element as the secret key $K_a$. In order to avoid any outside control over the verification of presence, also the random challenge $R_a$ is preferably generated by this secure element, which will verify the signature $S(R_a,I_b)$.

Generally, not all dongles i of a set s need to be present and have their presence verified for any one dongle i to provide a digital signature $S_a(M)$; the presence of a subset might be sufficient, e.g. in case of an M-of-N multi-signature where M is smaller than N and N is the total number of dongles i within the same set s. In the example shown in FIG. 2, dongles a and b verify and require the presence of one dongle before providing the requested signature; i.e. in this situation, dongle c need not be present for dongles a and b to provide their respective signatures $S_a(M)$ and $S_b(M)$ to the host h. Alternatively, dongle a and/or dongle b may store a lower limit of the number of other dongles, the presence of which must be proven, before computing the digital signature. In the use-case shown in FIG. 1, this lower limit may be either one or two. If dongle a stores a lower limit of two, it will attempt verification of both other dongles b and c and will compute the digital signature $S_a(M)$ only after the presence of both of them has been verified (e.g. both have provided a proof of presence in the form of a digital signature $S(R_a,I_b)$ or $S(R_a,I_c)$ respectively).

Dongle a is also configured to measure the time required for verifying the presence of dongle b. In detail, it is configured to measure the round-trip delay time $D(a,b)$ between sending the random challenge $R_a$ and receiving the digital signature $S(R_a,I_b)$. Only if the delay time $D(a,b)$ is within a predefined timeframe, for example 2 milliseconds (ms), and the digital signature $S(R_a,I_b)$ is valid, will dongle a proceed to compute the digital signature $S_a(M)$. As this condition is preferably tested within the secure element, the secure element preferably comprises a clock and—optionally—a internal power supply to reliably power the clock. If the proof of presence in the form of the digital signature $S(R_a,I_b)$ arrives later, for example after 3 ms, dongle a will not compute the digital signature $S_a(M)$ of the message M. The timeframe is effectively an upper limit on the round-trip delay time $D(a,b)$ and functions as a distance measure between the secure elements of the dongles a and b. The physical distance effects the round-trip delay time due to the limited speed for transmission of information (generally the speed of light). In practice, the round-trip delay time will however be dominated by delays in the transmission electronics mediating the connection between the secure elements of the two dongles a and b. In particular, the enforcement of a predefined timeframe will make it difficult or impossible to relay the connection between the dongles without notice.

Moreover, dongle a is configured to measure the signal strength of the direct wireless connection 4 to dongle b. Dongle a is configured to compute a digital signature $S_a(M)$ of a received message M only if the measured signal strength of the direct wireless connection 4 exceeds a predefined minimum signal strength, for example 4 dBm (equivalent to an estimated 10-meter range of a Bluetooth signal).

As will be explained in more detail in connection with FIG. 3, dongle c is configured to verify the presence of the mobile terminal $T_c$ before confirming its own presence to either dongle a or dongle b. At the same time, the mobile terminal $T_c$ is configured to confirm its presence only within a limited timeframe after authentication of the owner $O_c$ by entering a valid and authorised fingerprint on the fingerprint sensor 9.

Finally, dongle a stores a white list for identifying acceptable messages M. If the message M is a transaction, the white list contains for example five acceptable transaction targets (receiving addresses). If the host h requests signature of a message M comprising a transaction to a different target, dongle a denies to sign such a message M. The white list will preferably be stored inside the secure element of dongle a.

If in the above some functionality has been described with respect to a single dongle a, b or c, it will be apparent to those skilled in the art, that each such functionality may be implemented by any or all of the respective other dongles analogously and to a similar effect (often further increased security).

In order to further explain the present method, an exemplary and relatively simple embodiment will be discussed in chronological order along with the sequence diagram shown in FIG. 2. The initial situation in FIG. 2 is that the owners $O_a$ and $O_b$ have come to agree on performing a certain transaction and have invited the owner $O_h$ of the host h to coordinate, prepare and upload the transaction to the database 11, thus acting as coordinator. The two owners $O_a$ and $O_b$ have brought their respective dongles a and b, which are initially in standby mode and configured and initialised as described above in connection with FIG. 1. Of course, it would also be possible that any of the owners $O_a$, $O_b$ owns and operates the host h. However, for the sake of clarity, three separate owners $O_h$, $O_a$, $O_b$ are assumed here.

To begin with, the coordinator (that is, the owner $O_h$ and operator of the host h) in step 14 asks the owner $O_a$ of dongle a to activate the signing trigger of dongle a. Owner $O_a$ pushes the button 6 of dongle a, thereby activates the signing trigger 15 of dongle a and switches dongle a into signing mode for a limited timeframe 16 indicated by the left vertical bar parallel to the timeline of dongle a (e.g. for five minutes). In step 17 the owner $O_h$ asks the owner $O_b$ of dongle b to activate the signing trigger of dongle b. Owner $O_b$ pushes the button 6 of dongle b, thereby activates the signing trigger 13 of dongle b and switches dongle b into signing mode for a limited timeframe 12 indicated by the left vertical bar parallel to the timeline of dongle a. Now both dongles a, b are in signing mode.

The coordinator in step 18 enters the desired transaction parameters into the host h. Host h in step 19 compiles the entered transaction parameters into a draft transaction, which corresponds to the message M that needs to be signed with a multi-signature in order to form a complete and valid transaction. In detail, the message M comprises for example an identifier of at least one previous (source) transaction, a redeem script, to which said previous transaction is cryptographically linked, a transaction target address and a transaction amount. The status 20 of the transaction is indicated by a vertical bar parallel to the timeline of the host h.

Once the message M is prepared, the host h via connection 1 (see FIG. 1) transmits the message M to dongle a, which receives the message M. Dongle a finds itself in signing mode during the timeframe 16 and therefore proceeds to generate in step 21 a random challenge $R_a$, which is stored locally as indicated by 22. Dongle a transmits the random challenge $R_a$ over connection 4 to dongle b as a request for providing a zero-knowledge proof of the private identity $I_b$ and simultaneously starts an internal stopwatch. Dongle B receives the random challenge $R_a$ generated by dongle a, stores 23 the random challenge $R_a$, and, since it finds itself in signing mode during the timeframe 12, computes 24 a digital signature $S(R_a,I_b)$ of the random challenge $R_a$ using its private identity $I_b$. It stores 25 the digital signature $S(R_a,I_b)$ and transmits it back to dongle a. Dongle a receives the digital signature $S(R_a,I_b)$ from dongle b, which forms the requested zero-knowledge proof, and stops the internal stopwatch, which now reads the delay time D(a,b). Dongle a verifies 26 the presence of dongle b by checking, if the delay time D(a,b) is within the predefined timeframe and the signal strength of connection 4 measured by dongle a exceeds the predefined minimum signal strength and whether the digital signature $S(R_a,I_b)$ is valid according to the locally stored identity $P(I_b)$, i.e. verifying the received zero-knowledge proof. If all three conditions are met, the presence of dongle b is thus successfully verified, dongle a unlocks 27 the secret key $K_a$ and computes 28 the digital signature $S_a(M)$ of message M using the secret key $K_a$ and transmits the computed digital signature $S_a(M)$ to the host h.

The host h stores 29 the digital signature $S_a(M)$ as a partial signature portion (e.g. a partial "scriptSig") of the draft transaction. It is assumed, that the transaction as defined by the redeem script is a 2-of-3 multi-signature transaction. Thus, host h requires an additional signature from a second dongle i of the set s. Consequently, host h transmits via connection 2 the message M to dongle b. As dongle b is still in signing mode during the timeframe 12, it proceeds to generate 30 a random challenge $R_b$, which it stores 31 locally. In order to verify the presence of dongle a, dongle b transmits the random challenge $R_b$ to dongle a as part of a zero-knowledge protocol. Dongle a stores 32 the received random challenge $R_b$ and, also still being in signing mode during timeframe 16, signs 33 the random challenge $R_b$ with its private identity $I_a$, yielding the digital signature $S(R_b,I_a)$, which is stored 34 and transmitted back to dongle b as a zero-knowledge proof of presence. Dongle b verifies 35 the digital signature $S(R_b,I_a)$ with a locally stored identity $P(I_a)$. (Alternatively, the identity $P(I_a)$ may be signed by a certification authority z trusted by dongle b and transmitted together with the digital signature $S(P(I_a),I_z)$ computed by the certification authority with its private identity $I_z$ and with the digital signature $S(R_b,I_a)$ from dongle a to dongle b. Dongle b in this case stores only the identity $P(I_z)$ of the certification authority, verifies the received identity $P(I_a)$ of dongle a with the digital signature $S(P(I_a),I_z)$ and then verifies the presence of dongle a with the digital signature $S(R_b,I_a)$ and the received identity $P(I_a)$.) If the digital signature $S(R_b,I_a)$ received as a zero-knowledge proof of presence turns out valid, dongle b unlocks the secret key $K_b$ and computes 36 the digital signature $S_b(M)$ and transmits the digital signature $S_b(M)$ to the host h.

The host h now has received signatures $S_a(M)$, $S_b(M)$ from two dongles a, b therefore holds a complete signature portion 37. With this complete signature portion 37, host h compiles 38 a valid transaction 39. It then submits 40 the valid transaction 39 to the database 11. The database 11 (or effectively a network of nodes participating in the distributed public transaction directory) validates 41 the submitted transaction. The coordinator verifies 42 that the submitted transaction is included in the database 11 and therefore effective.

Figure 2:
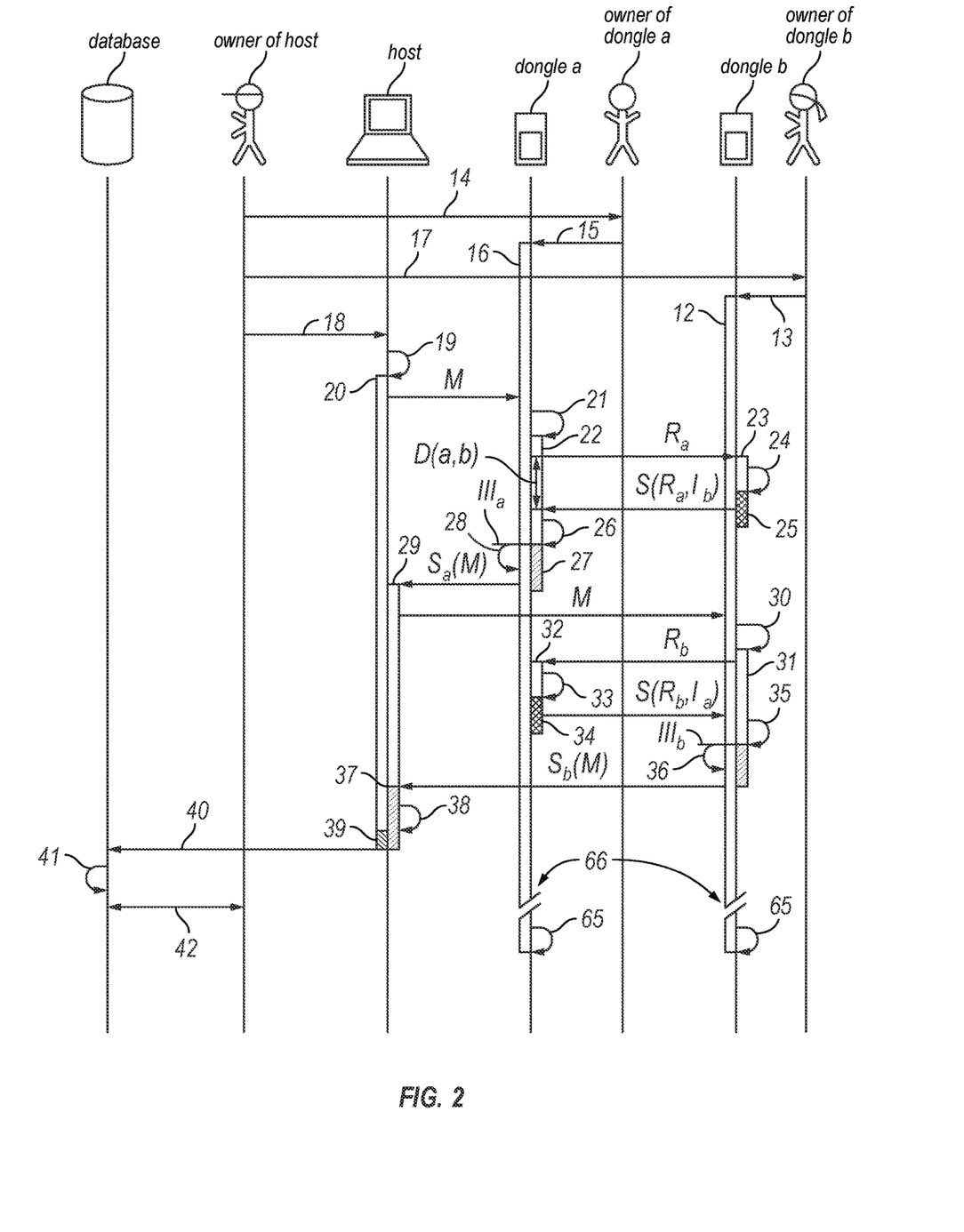
FIG. 2 shows a sequence diagram of the procedure for providing a digital signature according to the present invention using two of the dongles shown in FIG. 1.
Figure 3:
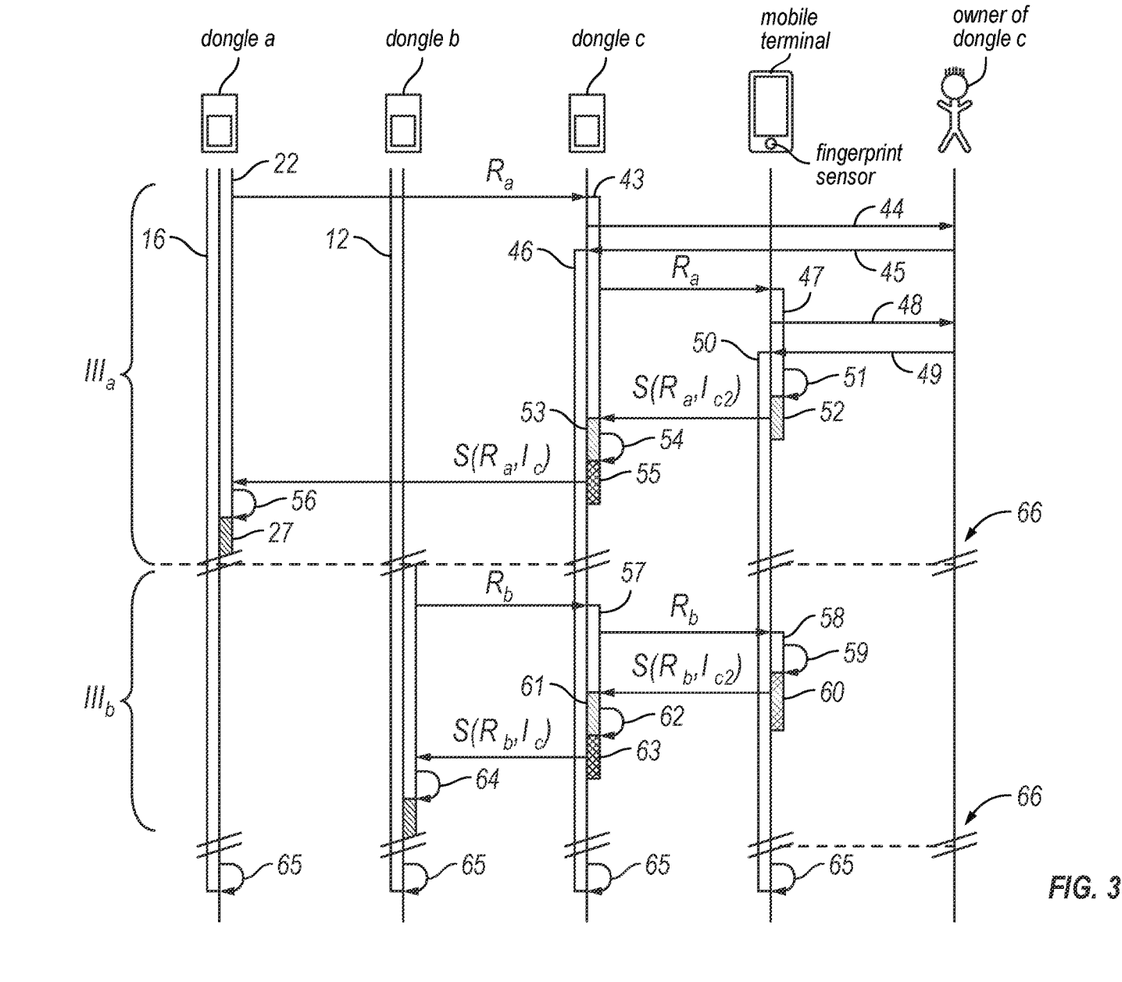
FIG. 3 shows a partial sequence diagram illustrating an extension of FIG. 2 using the third dongle and the mobile terminal shown in FIG. 1.

FIG. 3 shows a partial sequence diagram, which may extend the procedure described in connection with FIG. 2, if dongles a, b store a lower limit of two other dongles, the presence of which must be verified before a signature of a message M is provided. In this case, at the moment IIIa in FIG. 2 after verifying 26 the presence of dongle b, the sequence shown in section IIIa of FIG. 3 can be inserted. Dongle a transmits the random challenge $R_a$ to dongle c, which at this point is still in standby mode, but stores 43 the random challenge $R_a$ nevertheless. Dongle c notifies 44 its owner $O_c$ of the ongoing concerted signing procedure and its required proof of presence. In reaction to this notification, owner $O_c$ if they agree with the signing, activate a signing trigger 45 by pressing button 6 on dongle c, thereby putting dongle c into signing mode for a limited timeframe 46. Dongle c holds only a first part $I_{c1}$ of a private identity $I_c$, wherein the second part $I_{c2}$ of the private identity $I_c$ is held by the mobile terminal $T_c$. Therefore, for providing a valid proof of presence, dongle c transmits over connection 7 the stored random challenge $R_a$ received from dongle a to the mobile terminal $T_c$ for partial signing. The mobile terminal $T_c$ at this point is still in standby mode and stores 47 the received random challenge $R_a$. Mobile terminal $T_c$ notifies 48 its owner $O_c$ of the ongoing signing procedure and asks for authentication by entering a fingerprint on the fingerprint sensor 9. Owner $O_c$ enters 49 the requested fingerprint, thereby switching the mobile terminal $T_c$ into signing mode for a limited timeframe 50. Now in signing mode, mobile terminal $T_c$ computes 51 and stores 52 a partial digital signature $S(R_a,I_{c2})$ of the random challenge $R_a$ using the second part $I_{c2}$ of the private identity $I_c$ and transmits the partial digital signature $S(R_a,I_{c2})$ to dongle c over connection 7. Dongle c, which is still in signing mode during timeframe 46, stores 53 the received partial digital signature $S(R_a,I_{c2})$ and computes 54 the complete digital signature $S(R_a,I_{c1},I_{c2})=S(R_a,I_c)$ of the random challenge $R_a$ using the first part $I_{c1}$ of the private identity $I_c$. Dongle c stores 55 the complete digital signature $S(R_a,I_c)$ and transmits it back to dongle a over connection 5. Dongle a then verifies 56 the presence of dongle c—and implicitly of mobile terminal $T_c$—by verifying the received signature $S(R_a,I_c)$ with a locally stored identity $P(I_c)$. If successful, dongle a proceeds with computing 27 the digital signature $S_a(M)$ as described in connection with FIG. 2.

At the moment IIIb in FIG. 2 after verifying 35 the presence of dongle a by dongle b, the sequence shown in section IIIb of FIG. 3 can be inserted. At this point, dongle c and mobile terminal $T_c$ are still in signing mode during the timeframes 46, 50. Therefore, when dongle b transmits the random challenge $R_b$ to dongle c, dongle c stores 57 and immediately forwards the random challenge $R_b$ to the mobile terminal $T_c$ for partial signing. The mobile terminal $T_c$ stores 58 the received random challenge $R_b$ and computes 59 and stores 60 a partial digital signature $S(R_b,I_{c2})$ of the random challenge $R_b$ using the second part $I_{c2}$ of the private identity $I_c$. The mobile terminal $T_c$ transmits the partial digital signature $S(R_b,I_{c2})$ back to dongle c, which stores 61 the received partial digital signature $S(R_b,I_{c2})$ and computes 62 the complete digital signature $S(R_b,I_{c1},I_{c2})=S(R_b,I_c)$ of the random challenge $R_b$ using the first part $I_{c1}$ of the private identity $I_c$. Dongle c stores 63 the complete digital signature $S(R_b,I_c)$ and transmits it back to dongle b over a direct wireless connection between dongles b and c. Dongle b then verifies 64 the presence of dongle c and of mobile terminal $T_c$ by verifying the received signature $S(R_b,I_c)$ with a locally stored identity $P(I_c)$. If successful, dongle b proceeds with computing 36 the digital signature $S_b(M)$ as described in connection with FIG. 2.

At the end of the limited timeframes 12, 16, 46, 50 (i.e. a predefined time period after they have entered signing mode), the dongles a, b, c and the mobile terminal $T_c$ will autonomously switch 65 from signing mode into standby mode.

The parallel diagonal lines 66 crossing the timelines in FIG. 2 and FIG. 3 indicate, that an arbitrary amount of time has passed, during which other steps and state changes may have happened.

The invention claimed is:

1. A set of dongles for providing a digital signature,
    wherein the set comprises a first dongle and at least one other dongle,
    wherein the first dongle and the at least one other dongle each hold a secret key,
    wherein the first dongle and the at least one other dongle are each configured to receive a message, to compute a digital signature of the received message using the secret key, and to transmit the computed digital signature,
    wherein the first dongle is configured to, before computing the digital signature, verify the presence of the at least one other dongle,
    wherein the first dongle is configured to compute the digital signature responsive to a successful verification by the first dongle of the presence of the at least one other dongle, and
    wherein the first dongle stores a lower limit of the number of other dongles, the presence of which must be proven, before computing the digital signature.

2. The set according to claim 1, wherein the first dongle is configured to verify the presence of the at least one other dongle by requiring a zero-knowledge proof.

3. The set according to claim 1, wherein the first dongle is configured to measure the time required for verifying the presence of the at least one other dongle and to compute the digital signature only upon successful verification of the presence of the at least one other dongle within a predefined timeframe for each of the at least one other dongle.

4. The set according to claim 1,
    wherein the first dongle and the at least one other dongle are configured to establish direct wireless connections between each other for verification of presence, and
    wherein the first dongle is configured to measure the signal strength of the wireless connection to the at least one other dongle and to compute the digital signature in response to the signal strength exceeding a predefined minimum signal strength and/or a distance measure derived from the signal strength being below a predefined maximum distance for each of the at least one other dongle.

5. The set according to claim 1, wherein the at least one other dongle is configured to verify the presence of a mobile terminal before confirming its own presence to the first dongle.

6. The set according to claim 5, wherein the mobile terminal is configured to confirm its presence only within a limited timeframe after authentication of a user of the mobile terminal.

7. A method for providing a digital signature with a first dongle belonging to a set of dongles for providing a digital signature,
wherein the set comprises the first dongle and at least one other dongle, and
wherein the first dongle and the at least one other dongle each hold a secret key, the method comprising the following steps carried out by the first dongle:
receiving a message to be signed;
verifying the presence of a total number of the at least one other dongle, the total number being greater or equal to a predefined lower limit;
computing a digital signature of the message using the secret key responsive to a successful verification of the presence of as many of the at least one other dongle as defined by the predefined lower limit; and
transmitting the computed digital signature.

8. The method according to claim 7, wherein the step of verifying the presence of the at least one other dongle requires a zero-knowledge proof, including:
sending a request for providing the zero-knowledge proof to the at least one other dongle,
receiving a zero-knowledge proof from the at least one other dongle,
verifying the received zero-knowledge proof, and
completing a successful verification of the received zero-knowledge proof.

9. The method according to claim 7, wherein:
measuring, during verifying the presence of the at least one other dongle, the time required for verifying the presence, and
computing the digital signature of the received message responsive to determining that the measured time is within a predefined timeframe for each of the at least one other dongle.

10. The method according to claim 7, comprising:
measuring the signal strength of a wireless connection to the at least one other dongle, and
computing the digital signature of the received message responsive to determining that the measured signal strength exceeds a predefined minimum signal strength and/or a distance measure derived from the measured signal strength is below a predefined maximum distance for each of the at least one other dongle.

11. The method according to claim 8, comprising the following steps carried out by a second dongle, wherein the second dongle is one of the at least one other dongle:
verifying the presence of a mobile terminal connected to the second dongle; and
sending a reply to the request for providing a zero-knowledge proof to the first dongle responsive to a successful verification by the second dongle of the presence of the mobile terminal.

12. The method according to claim 5, comprising:
authenticating a user of the mobile terminal; and
sending the reply to the request for providing a zero-knowledge proof to the first dongle responsive to a successful authentication of the user of the mobile terminal.

13. The set according to claim 5, wherein the mobile terminal is configured to confirm its presence only within a limited timeframe after a biometric authentication of a user of the mobile terminal.

14. The method according to claim 12, comprising:
authenticating a user of the mobile terminal using at least partially biometric credentials.

15. The set according to claim 1, wherein the first dongle is configured to verify the presence of a mobile terminal before computing the digital signature and wherein the first dongle is configured to compute the digital signature responsive to a successful verification by the first dongle of the presence of one or more of the other dongles as well as the presence of the mobile terminal.

16. The set according to claim 15, wherein the mobile terminal is configured to confirm its presence only within a limited timeframe after a biometric authentication of a user of the mobile terminal.

17. The method according to claim 7, comprising the following steps carried out by the first dongle:
verifying the presence of a mobile terminal connected to the first dongle, and
computing the digital signature of the message responsive to a successful verification by the first dongle of the presence of one or more of the other dongles as well as the presence of the mobile terminal.

18. The method according to claim 17, comprising:
authenticating a user of the mobile terminal, and
computing the digital signature of the message responsive to a successful verification by the first dongle of the presence of one or more of the other dongles as well as a successful authentication of the user of the mobile terminal.

19. The method according to claim 18, comprising:
authenticating a user of the mobile terminal using at least partially biometric credentials.

* * * * *